UNITED STATES PATENT OFFICE.

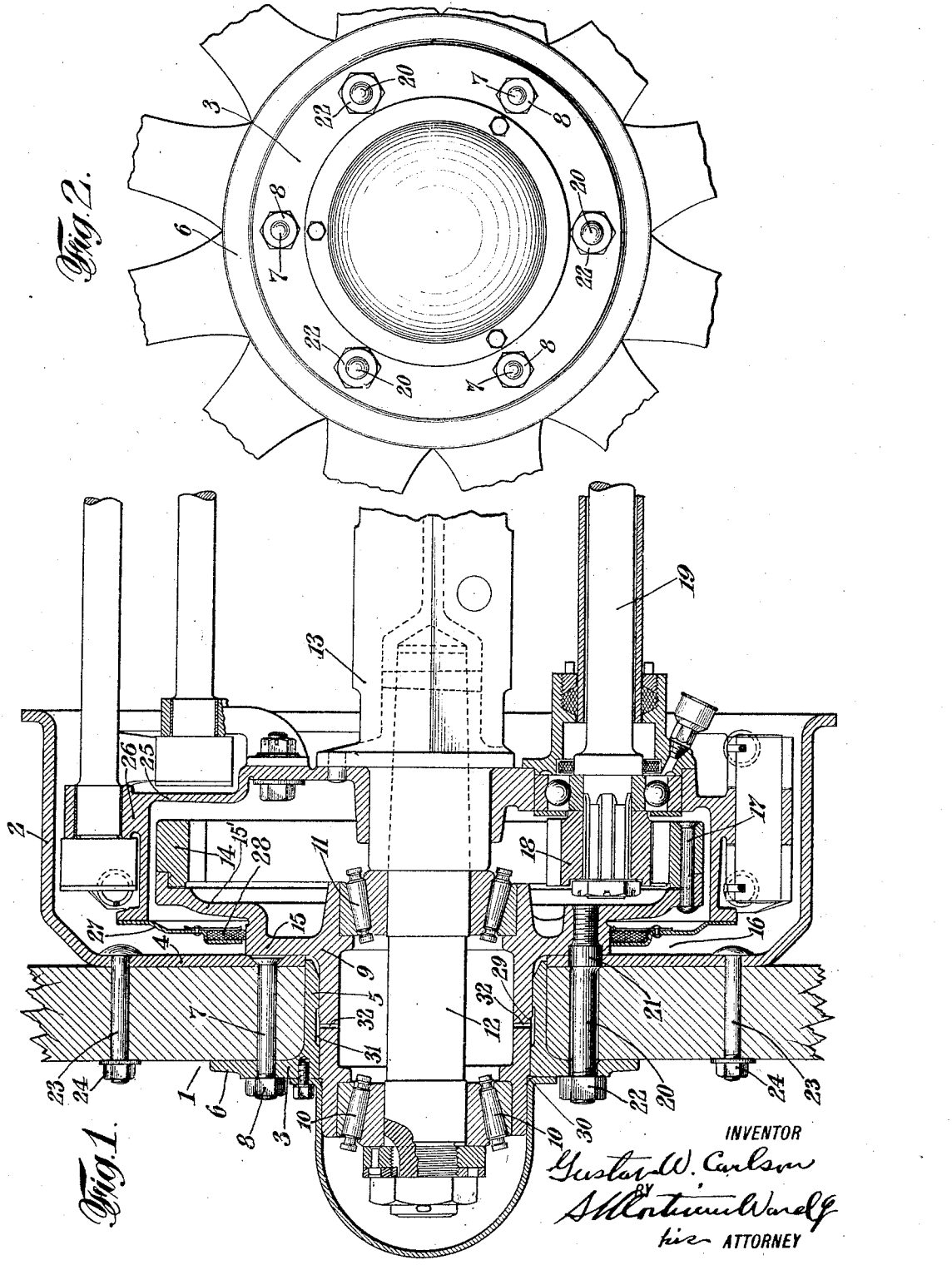

GUSTAV W. CARLSON, OF CLEVELAND, OHIO, ASSIGNOR TO THE TORBENSEN AXLE COMPANY, OF CLEVELAND, OHIO, A CORPORATION OF OHIO.

WHEEL AND AXLE CONSTRUCTION.

1,417,972.   Specification of Letters Patent.   Patented May 30, 1922.

Application filed April 22, 1921. Serial No. 463,473.

*To all whom it may concern:*

Be it known that I, GUSTAV W. CARLSON, a subject of King Gustav V of Sweden, (first U. S. citizenship papers taken out in September, 1918), and a resident of Cleveland, county of Cuyahoga, and State of Ohio, have invented certain new and useful Improvements in Wheel and Axle Constructions, of which the following is a specification.

My invention relates to wheel and axle constructions for motor driven road vehicles, and the invention is especially useful in connection with driven vehicles for trucks.

The object of the invention, generally stated, is to provide, in apparatus of the character described, a power driven hub upon which the wheel proper is removably mounted and the torque transmitted thereto in a reliable and efficient manner.

More specifically, the objects of the invention are to provide means whereby the wheel proper may be readily mounted upon and withdrawn from the driven hub; to utilize the brake drum flange or plate as a means for transmitting the driving torque from the gear at a point relatively near the hub, outwardly along the spokes from whence it is transmitted from the plate to the spokes nearer the rim, thus relieving the spokes of considerable strain; and to so arrange and construct the apparatus that an oil-tight housing may be provided for the driving gear, having a flange extending inwardly between the gear and the wheel proper a sufficient distance past the gear to permit of the desirable depth of oil without interfering with the other desired features.

My invention consists in the novel features, arrangement and construction of the parts hereinafter described in connection with the preferred embodiment of the invention, and the invention will be more particularly pointed out in the appended claims.

Further objects and advantages of the invention will more fully appear from the following description taken in connection with the accompanying drawings forming a part of this specification and in which—

Fig. 1 is a sectional view through a part of a wheel and outer end of the axle embodying the preferred form of my invention; and Fig. 2 is an end view of the same looking in the direction of the arrow shown in Fig. 1.

Referring to the drawings, the wheel proper 1 is provided with a brake drum 2 and a hub member 3. The brake drum 2 has an inwardly and radially extending flange or plate portion 4, and the hub member 3 has a cylindrical or sleeve portion 5 and an outer flange or plate 6. The outer flange of the hub member 3 and the flange of the brake drum are secured to the spokes in a unitary structure by means of bolts 7 and nuts 8. The hub member 3 and the brake drum flange or plate 4 together constitute an annular hub socket for the wheel spokes.

This unitary structure, which may be called the wheel proper, is adapted to be removably secured to the main hub 9 which, by means of outer and inner roller bearings 10 and 11, is journaled on a stub spindle 12 secured to the end of the dead axle or load-carrying member 13. The main hub is driven by a gear such for example as a ring gear 14 to which the hub is connected in any suitable manner, but preferably by means of a flange extending from the main hub to the gear and having a shouldered portion 15 against which the hub portion of the wheel proper is adapted to fit in order to facilitate a proper driving connection between said flange and the wheel proper. From this shouldered portion the flange is offset and extends outwardly so as to provide an annular space 16 between the outer portion 15' of the flange and the wheel proper for the purpose hereinafter described. The ring gear is secured to the outer end of the hub flange by means of rivets 17, the ring gear and flange fitting together by means of what might be termed a rabbeted or broken joint connection. The ring gear is driven by a pinion 18 carried at the end of jack shaft 19.

In order to transmit the driving torque from the main hub to the wheel proper, I provide a plurality of bolts 20, in this instance three, which are threaded into the shouldered portion of the hub flange and are each provided with an enlarged portion 21 fitting a recess in the shouldered portion of the flange, and also snugly fitting registering holes in the radial flange of the brake drum so as to insure a proper transmission of the torque from the hub to the flange with a minimum tendency of racking the parts and shearing the bolts. From this enlarged portion the bolt is reduced so as to provide an actual clearance or a very loose sliding fit between it and the spokes of the wheel and the outer plate 3. This serves the double function of preventing binding between the spokes and the bolts so as to enable the wheel proper to be more readily removed from the driving hub, and it also greatly relieves the inner ends of the spokes of strains which would result from transmitting the driving torque to them at these points. The wheel proper is firmly held in place on the driving hub and against the shouldered flange 15 by means of nuts 22 secured to the ends of the bolts 20. These bolts 20 with their nuts thus serve the double function of transmitting the torque to the wheel and of holding the wheel in position on the main or driving hub. Suitable means, such for example, as bolts 23 and nuts 24, connect the brake drum plate or flange 4 to the spokes further out along the latter and at a substantial distance from the bolts 20. By this arrangement the inner ends of the spokes are greatly relieved of strains which would result if the driving torque were transmitted directly to them at a point relatively near to the hub.

It is desirable to provide a housing for the ring gear which will permit the gear to run in oil, and in order to do this and to insure a proper depth of oil in the housing, I provide a housing consisting of a spider 25 having an annular flange 26 extending toward the wheel, the outer end of which is provided with a substantially radial flange 27 extending down within the opening 16 and carrying a suitable packing 28 making a running joint with the shouldered portion 15 of the main hub flange. It will be observed that this running joint extends inwardly toward the axis of the wheel beyond the teeth of the ring gear, thus permitting of the use of sufficient oil in the housing to well cover the teeth of the gear. It will thus be observed that by the above construction it is possible to reliably transmit the torque from the ring gear to the spokes at a point substantially removed from the inner end of the spokes and yet provide for an oil-tight housing permitting a suitable depth of oil for the ring gear.

It has been found in practice that where the wheel proper is left on the main hub for a considerable length of time, or where, due to grit or dirt or improper fitting, the parts are too tightly forced one upon the other, it is extremely difficult at times to remove the wheel from the main hub, and in order to insure against this difficulty, the outer surface of the hub proper or hub barrel is reduced in section at the points 29 and 30 so as to provide two steps, so to speak, in the outer surface of the main hub, and the wheel hub member 3 likewise has its front and rear ends of corresponding diameter with a groove 31 formed between the two. By this construction, if the wheel is just forced out on the main hub a slight distance after loosening the bolts 22, it may then rest on the portion of smaller diameter where it will be securely supported and yet freely movable back and forth as may be desired. I also provide oil ducts 32 in the drum of the main hub in order that the engaging surfaces of the main hub and of the wheel hub member 3 may be kept lubricated from the chamber of the main hub to facilitate the removal of the wheel proper from the main hub.

While I have described my invention according to the present preferred embodiment thereof, it will be obvious to those skilled in the art, after understanding my invention, that various changes and modifications may be made in the construction and arrangement of the part without departing from the spirit or scope of the invention, and I do not wish to be understood as limiting myself other than as indicated in the appended claims.

Having thus described my invention, what I claim as new and desire to secure by Letters Patent, is:

1. In apparatus of the character described, the combination of a main hub, a gear for driving same and means rigidly connecting said hub and gear, a wheel proper removably mounted upon the main hub and having at its hub portion an outer radial flange and an inner radial plate, bolts secured to the connecting means between the gear and hub at a relatively short radial distance from the main hub and adapted to detachably extend through the said inner plate, spokes and outer flange, and having nuts for detachably securing the wheel proper to said main hub, said bolts also adapted to transmit the driving torque from the gear to the said inner plate, and means connecting said inner plate to the spokes of the wheel substantially further out radially from the main hub than are said first torque-transmitting bolts.

2. In apparatus of the character described, the combination of a main hub, a ring gear for driving same and means rigidly connecting said gear and hub, a wheel proper removably mounted upon said hub and having a brake drum with an inwardly extending plate portion, and a hub member having a front radial flange, the hub member and inwardly extending portion of the brake drum together forming an annular hub socket for the wheel spokes, bolts relatively near the main hub securing said front flange and brake drum portion to the wheel spokes so that they are removable as a unit from the first hub, bolts secured to the connecting means between the ring gear and the main hub and adapted to detachably extend through the said inner brake drum portion, spokes and front flange, and having nuts for detachably securing the wheel proper to said main hub, said last mentioned bolts being also adapted to transmit driving torque from the ring gear to said brake drum portion, and means connecting the spokes with said brake drum portion further out radially from the main hub than are the last mentioned torque-transmitting bolts so as to transmit the torque from the brake drum portion to the spokes further out from the axis of the wheel.

3. In apparatus of the character described, the combination of a main hub, a gear for driving same, a wheel proper removably mounted upon said main hub and having a plate secured thereto at the inner side of the spokes, bolts secured to the hub and having enlarged portions near their said secured ends partly countersunk in their securing member and fitting openings in said wheel plate to transmit driving torque to said plate, and having reduced extensions extending with a sliding fit through openings in the wheel spokes whereby the wheel proper may be more readily pulled from said bolts, and nuts securing said wheel upon said bolts.

4. In apparatus of the character described, the combination of a main hub, a gear for driving same, a wheel proper removably mounted upon said main hub and having a plate at the inner side of the spokes, and also a front radial flange, bolts securing said front flange and plate to the wheel spokes so that they are removable as a unit from the first hub, bolts secured to the hub and having enlarged portions near their secured ends partly countersunk in their securing member and fitting openings in said wheel plate to transmit driving torque to said plate, and having reduced extensions extending with a sliding fit through openings in the wheel spokes and front flange whereby the wheel proper may be more readily pulled from said bolts, nuts securing said wheel upon said bolts, and means connecting the wheel spokes with said wheel plate further out radially from the main hub than are the first mentioned torque-transmitting bolts, so as to transmit driving torque through said wheel plate to relieve the inner ends of the spokes.

5. In apparatus of the character described, the combination of a dead axle, a driven hub journaled thereon, a wheel proper removably mounted on the hub to be removed as a unit therefrom, a ring gear concentric with said hub and a member extending outwardly from the hub for connecting the gear to the hub, said member having a shouldered portion extending a short radial distance from the hub, against which the hub portion of the wheel proper is adapted to fit, and having an offset portion extending to the ring gear so as to provide an annular opening between the wheel proper and said offset portion, said opening extending closer to the axis of the dead axle than does the ring gear, an oil-tight housing for the ring gear extending from the dead axle outwardly toward the wheel and having a flange portion extending within said annular opening between the wheel and the ring gear, said flange having a running joint with the offset member at a point nearer the axis of the dead axle than is the ring gear so as to provide for a suitable depth of oil in the housing, means secured to the shouldered member and passing into the wheel proper for transmitting the torque thereto, and means for holding the wheel in place against said shoulder.

6. In apparatus of the character described, the combination of a dead axle, a driven hub journaled thereon, a wheel proper removably mounted on the hub and having a plate secured thereto at the inner side of the spokes, said wheel and plate being removable as a unit from the hub, a ring gear concentric with said hub and a flange extending outwardly from the hub for connecting the gear thereto, said flange having a shouldered portion extending a short radial distance from the hub against which the hub portion of the wheel proper is adapted to fit and having an offset portion extending to the ring gear so as to provide an annular opening between the wheel proper and said offset portion, said opening extending closer to the axis of the dead axle than does the ring gear, an oil-tight housing for the ring gear extending from the dead axle outwardly toward the wheel and having a flange portion extending within said annular opening between the wheel and the ring gear, said flange having a running joint with the hub flange at a point nearer the axis of the dead axle than is the ring gear so as to provide for a suitable depth of oil in the housing, bolts secured to the shouldered member and having enlarged portions near their secured ends partly countersunk in the shouldered flange and fitting openings in said wheel plate to transmit driving torque to said plate, and means connecting the wheel spokes to said wheel plate further out radially from the main hub than are the first mentioned torque-transmitting bolts so as to transmit driving torque through said wheel plate to relieve the inner ends of the spokes.

7. In apparatus of the character described, the combination of a main hub, a gear for driving same, a wheel proper having a hub removably mounted upon said main hub, a lubricating chamber in the main hub, and one or more lubricating openings through the barrel of the main hub for supplying lubricant to the outer surface thereof to lubricate the same where engaged by the wheel hub, to facilitate removal of the wheel from the main hub.

8. In apparatus of the character described, the combination of a main hub, a gear for driving same, a wheel proper having a hub removably mounted upon said main hub, the outer surface of the barrel of the main hub having a plurality of portions of different diameters, the inner one of said portions being that of greatest diameter and the portions being of progressively decreasing diameters toward the outer end of the hub, the wheel hub having an inner hub portion adapted to fit upon said inner portion of the main hub, and also having another portion of less diameter adapted to fit upon one of the other portions of the main hub, and having a groove between its said two portions, a lubricating chamber in the main hub, and one or more lubricating openings through the barrel of the main hub for supplying lubricant to the groove, whereby the removal of the wheel from the main hub is facilitated.

9. An apparatus of the character described, the combination of a main hub, a gear for driving the same, said hub and gear comprising a pair of members rigidly connected together, a wheel proper removably mounted upon the main hub and having a plate at the inner side of the spokes and also having an outer radial flange, bolts secured to one of said pair of members at a relatively short radial distance from the main hub, said bolts having portions near their secured ends fitting openings in said wheel plate to transmit driving torque to said plate and having extensions extending with a loose fit through openings in the wheel spokes, said extensions also extending through said outer flange, nuts securing said wheel upon said bolts, and means connecting the wheel spokes with said wheel plate further out radially from the main hub than are the first mentioned torque-transmitting bolts, so as to transmit driving torque through said wheel plate to said spokes to relieve the inner ends of the spokes.

In testimony whereof, I have signed my name to this specification.

GUSTAV W. CARLSON.